US007266927B2

(12) United States Patent
Higgs

(10) Patent No.: US 7,266,927 B2
(45) Date of Patent: Sep. 11, 2007

(54) DRIVE-IN MOVIE THEATER WITH SHORT RANGE SOUND SYSTEM

(76) Inventor: Roy Higgs, 209 Riggs Ave., Severna Pk., MD (US) 21146

( * ) Notice: Subject to any disclaimer, the term of this patent is extended or adjusted under 35 U.S.C. 154(b) by 236 days.

(21) Appl. No.: 10/614,436

(22) Filed: Jul. 7, 2003

(65) Prior Publication Data

US 2004/0022396 A1 Feb. 5, 2004

Related U.S. Application Data

(63) Continuation of application No. 09/985,341, filed on Nov. 2, 2001, now abandoned.

(51) Int. Cl.

| | |
|---|---|
| ***E01F 9/00*** | (2006.01) |
| ***E04H 3/10*** | (2006.01) |
| ***E04H 3/12*** | (2006.01) |
| ***H04B 3/00*** | (2006.01) |
| ***H04B 7/00*** | (2006.01) |
| ***H04R 27/00*** | (2006.01) |
| ***H04H 7/00*** | (2006.01) |
| *H04B 1/06* | (2006.01) |

(52) U.S. Cl. ............................ 52/175; 52/174; 52/176; 52/6; 52/8; 381/77; 381/78; 381/82; 455/3.06; 455/41.2; 455/344

(58) Field of Classification Search .................. 381/77, 381/78, 82; 52/6, 8, 79.3, 174, 175, 176; 455/3.06, 344, 44.2, 345

See application file for complete search history.

(56) References Cited

U.S. PATENT DOCUMENTS

| | | | | |
|---|---|---|---|---|
| 1,034,864 | A | | 8/1912 | Best et al. |
| 1,039,545 | A | | 9/1912 | Knight |
| 1,629,787 | A | | 5/1927 | Hackett |
| 1,909,537 | A | | 5/1933 | Hollingshead, Jr. |
| 2,638,636 | A | | 5/1953 | Pool |
| 2,791,002 | A | * | 5/1957 | Clark .............................. 52/6 |

(Continued)

OTHER PUBLICATIONS

Higgs, Roy. "Extensions to and refurbishment of Menlyn Park Shopping Centre, Pretoria", Plasnning: Architectural and Planning Review for Southern Africa (No. 164. pp. 30-35), Aug. 2000. http://www.ddg-usa.com/press_room/articles.html.*

(Continued)

*Primary Examiner*—Vivian Chin
*Assistant Examiner*—Devona E. Faulk
(74) *Attorney, Agent, or Firm*—J. John Shimazaki

(57) ABSTRACT

The present invention relates to a drive-in movie theater and/or events center preferably located on top of one or more parking garages located at a shopping mall or other similar complex. The drive-in theater preferably has a short range radio broadcast system that can send radio signals to cars on the parking garage, wherein movie-goers can listen to the movie sound tracks on their own car stereos/radios. When needed, the present system contemplates having more than one transmitter, each operating at the same or different frequency, so that the effective service range of each transmitter can be made within limited guidelines set by the FCC. The drive-in theater can be combined with an events center and connected to a shopping mall where access to restaurants and retail establishments can be provided.

1 Claim, 7 Drawing Sheets

U.S. PATENT DOCUMENTS

| | | | | |
|---|---|---|---|---|
| 2,831,217 | A | | 4/1958 | Lombardo |
| 3,040,913 | A | * | 6/1962 | Foster, Jr. et al. .......... 414/236 |
| 3,131,351 | A | * | 4/1964 | Herzfeld et al. ........... 455/3.06 |
| 3,422,581 | A | * | 1/1969 | Allen .............................. 52/6 |
| 3,562,984 | A | | 2/1971 | Merle et al. |
| 4,209,663 | A | | 6/1980 | Sekiguchi |
| 4,287,388 | A | | 9/1981 | Beer et al. |
| 4,884,662 | A | | 12/1989 | Cho et al. |
| 4,901,482 | A | | 2/1990 | Lockard et al. |
| 5,199,108 | A | | 3/1993 | Morgan et al. |
| 5,570,138 | A | | 10/1996 | Baron |
| 6,115,974 | A | | 9/2000 | Milanian |
| 6,414,789 | B2 | * | 7/2002 | Braun ........................ 359/460 |
| 6,832,452 | B1 | * | 12/2004 | Simens ............................ 52/6 |

OTHER PUBLICATIONS

Article and drawing entitled “A World First for Menlyn Park Shopping Center”, published in S. Africa on or about Nov. 1999 by Old Mutual Properties, depiciting applicant’s design of a roof-top drive-in cinema at a shopping mall in South Africa.*

Higgs, Roy. “Extensions to and refurbishment of Menlyn Park Shopping Centre, Pretoria”, Architectual and Planning Review for Southern Africa (No. 164. pp. 30-35), Aug. 2000. http://www.ddg-usa.com/press_room/articles.html.*

Artical and drawing entitled “A World First for Menlyn Park Shopping Center”, published in S. Africa on or about Nov. 1999 by Old Mutual Properties, depiciting applicant’s designa of a roof-top drive in cinema at a shopping mall in South Africa.*

Higgs, Roy. Extensions to and rerurbishment of Menlyn Park Shopping Centre, Pretoria, Planning Architectual and Planning Review for Southern Africa (No. 164, pp. 30-35), Aug. 2000. http://www.ddg-usa.com/press_room/articles.html.*

Higgs, Roy. Extensions to and refurbishment of Menlyn Park Shopping Centre. Pretoria, Planning Architectural and Planning review for Southern Africa (No. 164, pp. 30-35), Aug. 2000. hyttp/www.ddg-usa.com/press_room/articles.html.*

Menlyn Park Shopping Centre. Architect and Builder, Mar./Apr. 2001.*

Article and drawing entitled “A world first for Menlyn Park shopping center”, published in S. Africa on or about Nov. 1999, by Old Mutual Properties, depicting Applicant’s design of a roof-top drive-in cinema at shopping mall in South Africa.

* cited by examiner

DRIVE-IN MOVIE THEATER WITH SHORT RANGE SOUND SYSTEM

RELATED APPLICATION

The present application is a continuation of U.S. application Ser. No. 09/985,341, filed on Nov. 2, 2001 now abandoned.

FIELD OF THE INVENTION

The present invention relates to movie theaters, and in particular, to a drive-in movie theater and/or events center constructed on top of one or more parking garages in a shopping mall or other similar complex, utilizing a short range radio broadcast system for movie sound.

BACKGROUND OF THE INVENTION

Shopping malls have grown in size and complexity in recent years. Mega-shopping malls, as they are often called, have evolved, wherein the trend has been to make shopping malls more than just places to shop. In many cases, shopping malls not only have department stores, world class restaurants, and specialty stores, but also various entertainment complexes, such as movie theaters, children's play areas, and, in some cases, even theme parks with roller coaster rides.

Most large shopping malls are built with parking garages, which allow people to conveniently park their cars. Many parking garages are multi-level structures that enable a large number of cars to be parked in a relatively small area. Most parking garages simply provide parking spaces, and do not provide any other usable space. In this respect, very little has been done in the past to increase the usable space such as on top of parking garages at malls.

There have been attempts in the past to create buildings in combination with parking structures. For example, in U.S. Pat. No. 1,629,787 issued to Hackett, a multi-floor bridge approach structure is disclosed which has a spiral ramp and, in one embodiment, an auditorium, a recreation hall, and a roof garden on top. This structure has parking spaces on the corners of each level, as well as parking spaces on the top floor.

In another structure, shown in U.S. Pat. No. 3,562,984, a structure is built above an existing freeway. In this patent, usable dwelling spaces, consisting of restaurants, motels, service stations, etc., are constructed with parking spaces above an existing freeway. Easy access is provided so that motorists can exit directly from the freeway into the complex and enter back into the freeway from the complex.

In other examples, drive-in movie theaters have been built in conjunction with various structures. For example, in U.S. Pat. No. 3,422,581 issued to Allen, a domed indoor drive-in theater is shown wherein a multi-level parking structure is provided inside a dome with separate movie screens located on each level. U.S. Pat. No. 2,831,217 issued to Lombardo also shows a drive-in movie theater that has an outdoor sports arena connected thereto so that persons attending a sporting event can also attend a movie.

Notwithstanding the above, no attempts have been made in the past to build shopping malls or other complexes with drive-in movie theaters and/or events centers located on top of one or more parking garages. That is, no attempts have been made to provide additional usable space on top of parking garages, to maximize the space and expand the variety of uses offered by shopping malls in such manner.

SUMMARY OF THE INVENTION

The present invention relates to a new design for a shopping mall or other similar complex, wherein a drive-in movie theater and/or events center is/are located on top of one or more parking garages. While parking garages have been built in many places, including under and in office buildings, and in connection with various types of shopping mails, most parking garages are used exclusively for parking. One reason that this is so is because most parking garages are structurally designed to support only the weight of cars, not to meet the more strict building code requirements that exist for inhabited dwelling spaces. In this respect, the structural capacity of most parking garages is typically inadequate to meet the structural building code requirements for other spaces.

In one embodiment of the present invention, a drive-in movie theater is provided on top of one or more parking garages located at a shopping mall. In this embodiment, the top floor of the garage is preferably provided with a large screen and multiple inclined parking spaces from which moviegoers can watch movies. The screen is preferably located on one end of the top floor and extends relatively upright in relation thereto. In this embodiment, the projector which projects moving images onto the screen is preferably located in a building, such as located on the end opposite the screen. This arrangement allows the projector building to be used as a restaurant, or other eating and/or retail area. In the preferred embodiment, tables and chairs can be provided adjacent the restaurant, and concessions and souvenir stands, rest rooms, etc., can be provided in and around the building if desired.

The parking garages are preferably structurally reinforced so that they comply with building code requirements applicable for the uses that are to be made of the space. That is, the structure of the parking garage is preferably designed to be strong enough to meet the additional design load requirements that are applicable for the uses to be employed by the structure.

In another aspect of the present invention, the sound system used to enable moviegoers to listen to the movies at the drive-in theater is preferably a short range radio broadcast system that can send signals capable of being received by existing stereos/radios inside cars. That is, movie sound is preferably broadcast in a manner which allows people inside their own cars to listen on their existing car stereos/radios. This avoids the need to use wired posts and speakers, such as used in past drive-in theaters.

The broadcasts are preferably short range so that only cars in the immediate area can receive the signals. The power needed to send the signals can also be relatively low. Ideally, the signals are low enough so that the signals will not carry beyond the area of the drive-in theater.

Where short range radio broadcast licenses are available, such as from the FCC, the present invention contemplates that the appropriate short range frequency can be assigned to reduce the likelihood of interference with other radio stations. In areas where no such licenses are available, the present invention contemplates that the short range radio system of the invention be capable of sending signals that are limited in power and scope so that only those cars that are located in the immediate vicinity of the drive-in theater are able to receive the signals. Under current FCC laws, unlicensed short range AM radio broadcasts are allowable so long as they are limited to an effective service range of about 200 to 250 feet, and unlicensed short range FM radio broadcasts are allowable so long as they are limited to an effective service range of about 35 to 100 feet.

The preferred embodiment of the present invention contemplates that the drive-in theater can be adapted with the appropriate number of radio transmitters with antennas and frequencies necessary to send signals to every car on the top floor, regardless of the size of the top floor, and taking into account the limitations imposed by the FCC. That is, when the top floor is larger than the area that can be reached by a single transmitter (operating within the FCC guidelines discussed above), the present invention contemplates that more than one transmitter with antenna can be provided, such as at different locations on the top floor. The present invention also contemplates that each transmitter be capable of operating at a different frequency if needed, so that the range of each transmitter can be maintained within the limitations set by the FCC.

For example, if the top floor is larger than the area that can be serviced by one AM transmitter, i.e., larger than a radius of 250 feet, the top floor can be divided into multiple areas, each having a separate transmitter. By operating each transmitter at a different frequency, none of the broadcasts would individually extend beyond the allowable service range set by the FCC. When different frequencies are used, each area is preferably identified so that movie-goers will know which frequency must be used to receive the signals at that location, i.e., the frequency of the transmitter closest to the parking space. If permitted by the FCC, each transmitter can also be operated at the same frequency, wherein one area of the top floor can be reached by one transmitter, and other areas can be reached by other transmitters.

More transmitters with antennas (and frequencies) may have to be used when short range FM radio broadcast systems are used because the allowable service range for FM broadcasts is less than for AM broadcasts. In such case, the top floor can be divided into several more areas, with a transmitter located in each one, i.e., such as one every 200 feet or less.

The above sound system can be used in any type of drive-in movie theater, not just those located in parking garages.

The present invention also contemplates that a shopping mall or similar complex can be provided with a drive-in movie theater and events center on top of one or more parking garages. In this embodiment, both the drive-in theater and events center are connected to the shopping mall so that persons can easily access those areas directly from the mall. Also, both are preferably positioned on top of parking garages so that easy access can be provided between the mall, the drive-in theater, the events center, and parking garages.

The events center is preferably an auditorium with stadium type seating which can be used for live events such as sporting events, concerts, plays, demonstrations, speeches, conventions, etc. The preferred auditorium has a stage and backstage area, as well as an inclined seating area, with seats and/or bleachers that extend around the perimeter of the auditorium. On the other hand, the auditorium can be any structure that allows for a large number of people to gather in one place.

Preferably, the events center and its parking garage are connected to the shopping mall so that immediate access to the shopping area and restaurants are available. In this respect, restaurants are preferably located adjacent the events center so that patrons of the restaurants can directly view activities taking place in the events center. In one embodiment, restaurants can be provided with special eating areas and/or windows that overlook the stage area, wherein premium entertainment and restaurant packages can be offered. Virtually any type of retail shopping environment can be provided adjacent the events center.

DETAILED DESCRIPTION OF THE INVENTION

Figure 1:
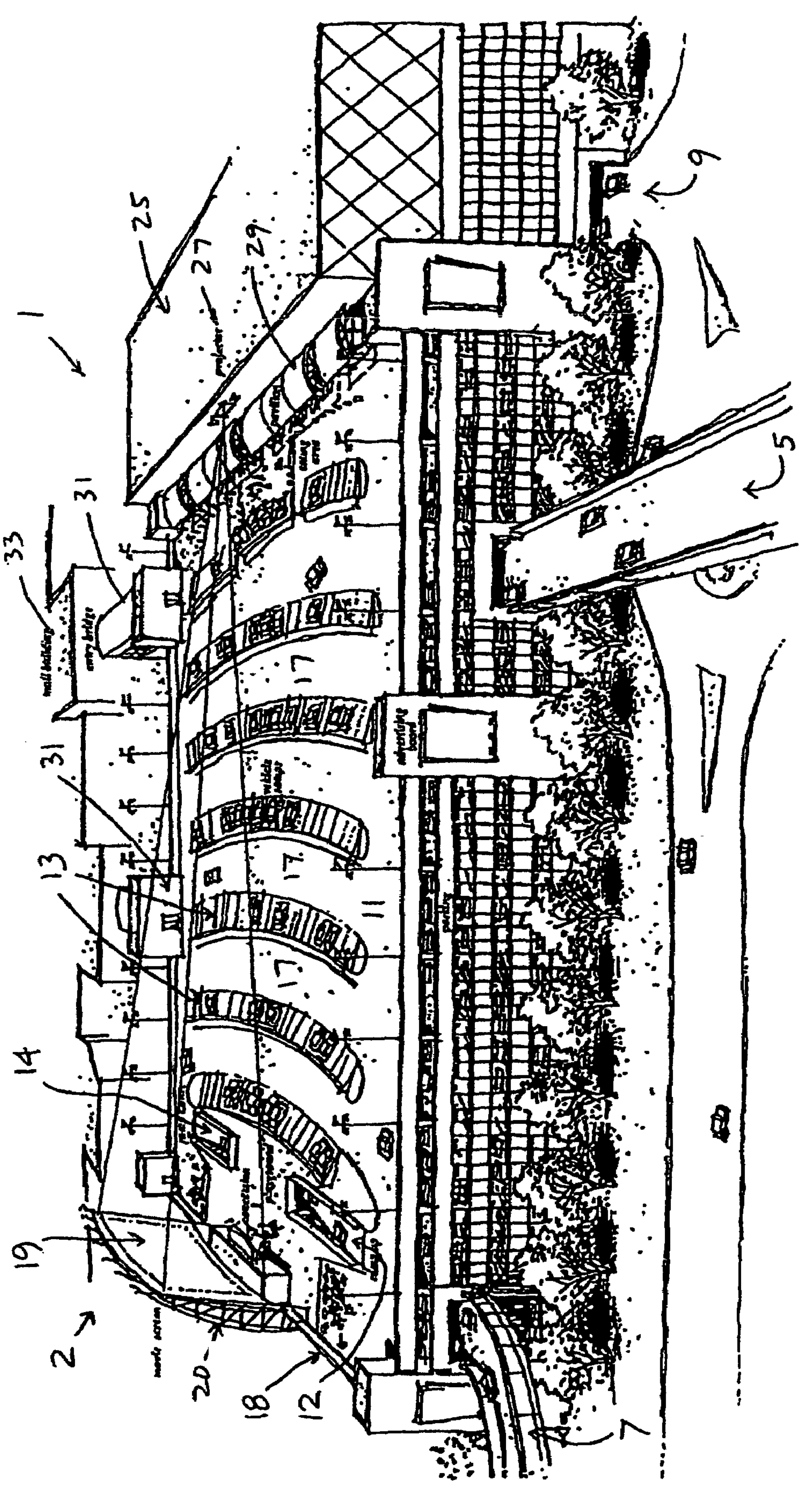
FIG. 1 is a perspective view of the drive-in theater of the present invention showing the screen located at one end of the top floor and a projector building/housing located at the other end.
Figure 3:
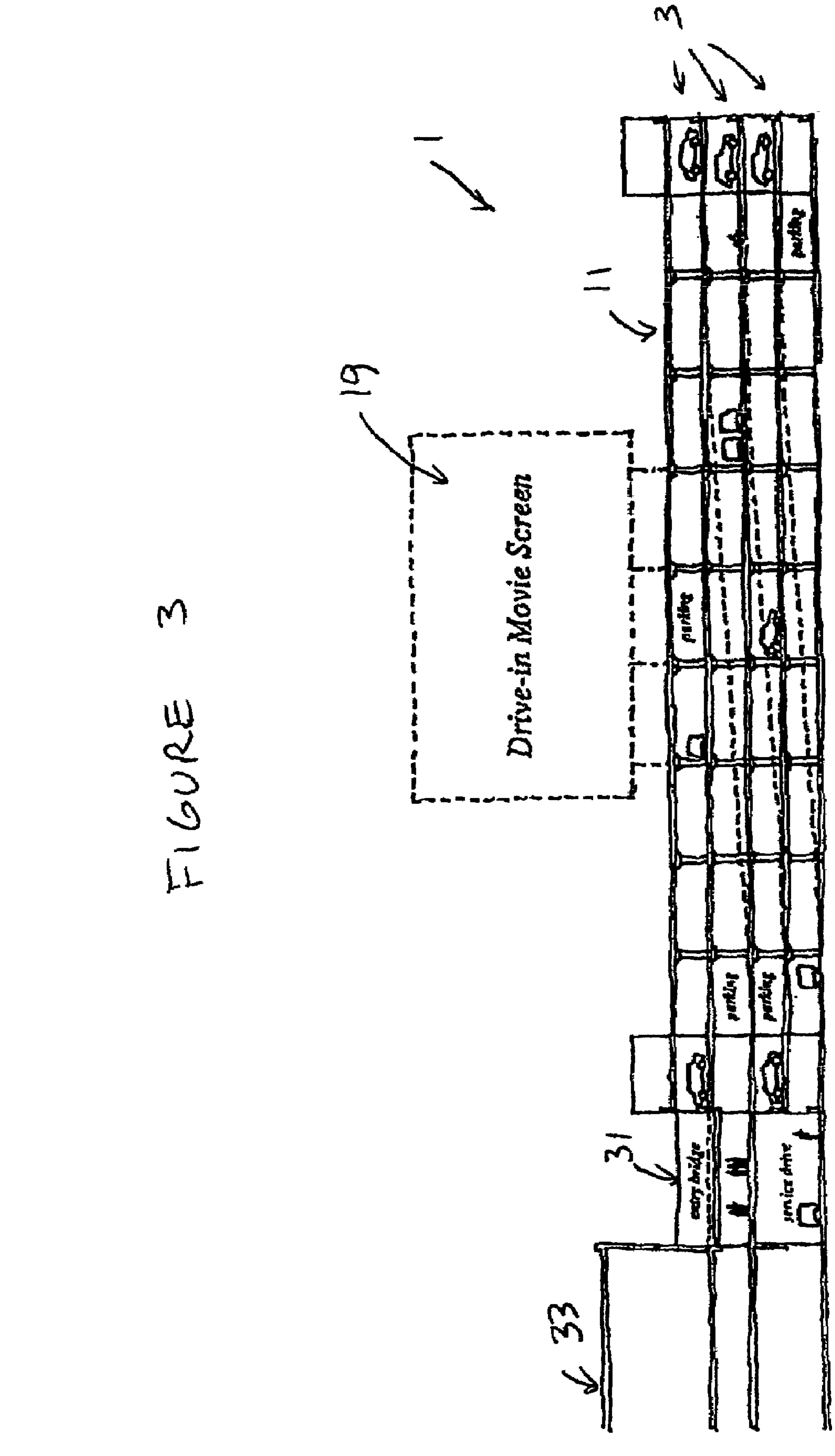
FIG. 3 is a sectional view of the drive-in theater of the present invention showing the screen located on the top floor of the parking garage, wherein the parking garage is connected to a shopping mall by one or more pedestrian bridges.
Figure 4:
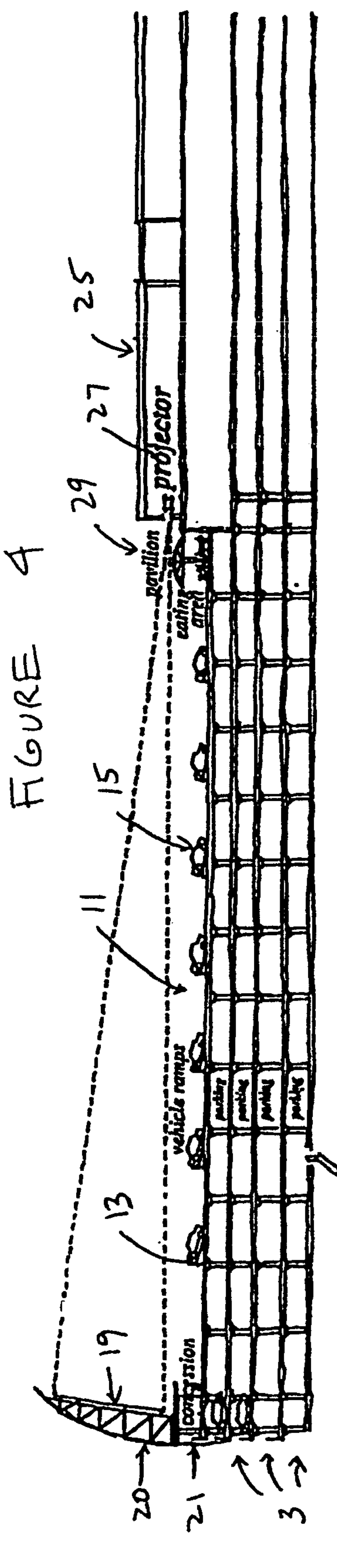
FIGS. 4 and 5 are additional sectional views of the drive-in theater of the present invention showing the screen located at one end of the parking garage and the projector building/housing located at the other end, wherein the building/housing has eating areas adjacent thereto.
Figure 5:
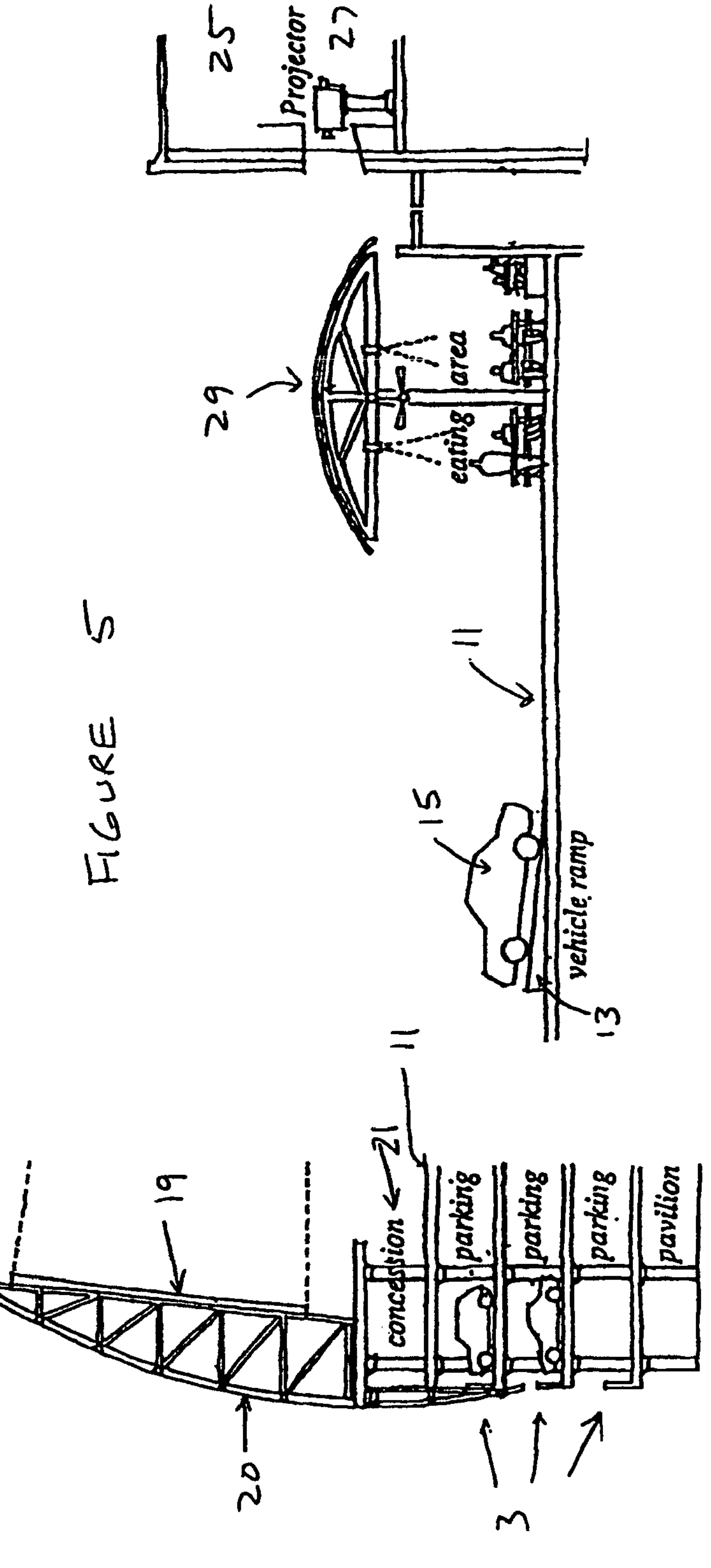

FIG. 1 is a perspective view of a parking garage showing the drive-in theater embodiment of the present invention 2. The parking garage 1 is similar to a standard parking garage having multiple levels 3. In this example, the parking garage has five levels, as shown in FIGS. 3-5, but the present invention contemplates that any number of levels can be provided. In the parking garage 1 shown, there are entrances that cars can use to enter into the parking garage, including a bridge 5, a ramp 7, and a lower level entry 9 for access from the main street below.

On top of the parking garage 1 is a top floor 11. A ramp up 12 and a ramp down 14 which allow cars to drive up onto the top floor 11 and back down again onto the lower levels are preferably provided.

On the top floor 11, there is preferably a plurality of inclined parking ramps 13 with parking spaces thereon which enable automobiles to be parked at an inclined angle in relation to the top floor 11. The angle of inclination is preferably provided to allow movie-goers inside the automobiles to view movie screen 19 without being obstructed by cars in front of them. A plurality of aisles 17 is preferably provided, which the cars can use to access the parking spaces and ramps 13.

The movie screen 19 is preferably extended upward from one end of the top floor 11. In this embodiment, the movie screen 19 is relatively vertical but has a slight curvature thereon to better accommodate the projected images from the projector 27. The movie screen 19 can be constructed in any conventional manner and can have support frames 20 to provide rigidity and support for the screen surface.

Figure 2:
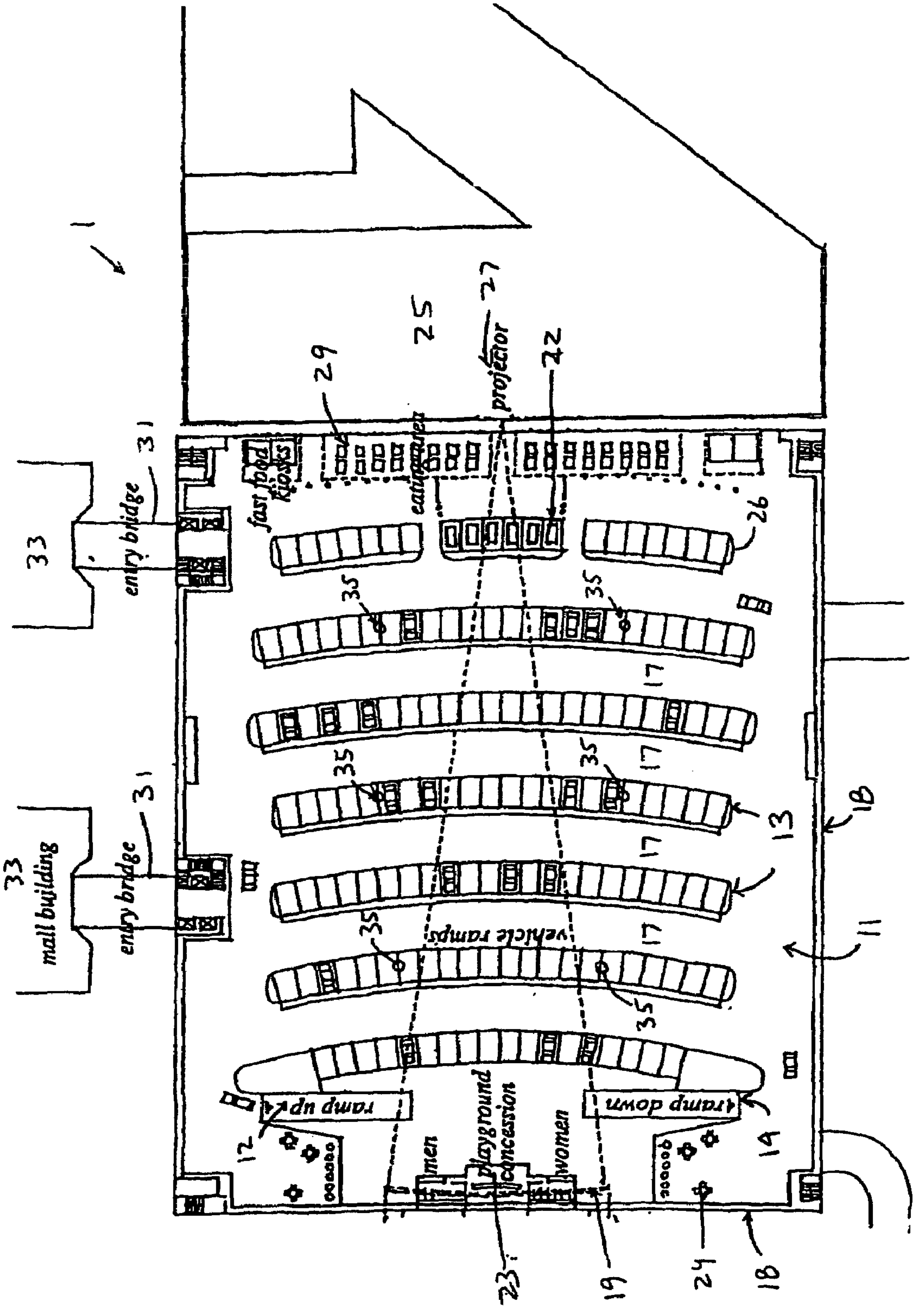
FIG. 2 is a plan view of the drive-in theater of the present invention showing the top floor and projector building/housing on top of the parking garage.

In the vicinity of the screen, which is preferably located along one end of the top floor 11, there can be a number of usable spaces, such as a concessions stand 21, as shown in FIGS. 4 and 5, a playground 23 for children, seating areas 24, and restrooms, etc., as shown in FIG. 2.

The top floor 11 is preferably provided with a wall 18 around the perimeter thereof, as shown in FIG. 1. The wall 18 helps to not only provide safety to pedestrians on the top floor 11, but also helps to block others in adjacent areas, such as along the main street below, from being able to see the movie screen 19. In this respect, the orientation of the screen 19 on the parking garage 1, with a projector housing or building 25 located on one end, can help to close off the top floor 11. This can serve to reduce the likelihood that motorists driving along the main street below could view the images projected on the screen 19. The orientation of the entire parking garage 1 in relation to the shopping mall 33, can also provide a means of blocking views from adjacent areas around the mall.

The projector building or housing 25 is preferably constructed on the top floor 11 of the parking garage 1. The building 25 preferably houses the projector 27, as well as eating and/or retail establishments, etc., if desired. Where there is a desire to provide restaurants on the top floor 11, various outdoor and indoor seating areas can be provided. Also, concessions stands, souvenir stands, rest rooms, etc., can be provided. Another feature that can be provided on the top floor 11 is a series of built-in, customized, vintage automobiles 22, which movie-goers can rent.

The parking garage 1 of the present invention is preferably connected to the main shopping mall 33, or other similar complex, such as by a pedestrian bridge 31, as shown in FIGS. 1-3. One or more such bridges 31 can be provided to give moviegoers direct access to the mall 33 from the top floor 11, and vice versa. In other embodiments, the parking garage 1 can be constructed directly adjacent the shopping mall 33, i.e., such that movie-goers can enter onto the top floor 11 from the mall 33. Elevators are preferably provided in the parking garage 1 to enable shoppers to move from one level to another. This enables moviegoers, for example, that want to rent a vintage automobile, to park in the parking garage 1 and then go to the top floor 11 to watch movies on the screen 19.

FIG. 2 shows a site plan of the top floor 11 of the parking garage 1 of the present invention. The top floor 11 of the parking garage 1 of this embodiment is preferably rectangular in shape, with the projector housing or building 25 extending along one end thereof. The site plan shown in FIG. 2 shows the layout of the inclined parking spaces 13 and aisles 17 wherein cars 15 can be parked thereon. The vintage cars 22 are preferably provided along the back row 26.

One of the improvements provided by the present invention is the use of a low-power, short-range radio broadcast system to provide sound for the movies. That is, rather than having separate wired posts and speakers for each automobile, such as in past drive-in theater designs, the present invention contemplates using short range radio broadcast systems to broadcast movie sound, wherein the cars on the top floor 11 can then receive the signals using their own sound systems. This way, movie-goers can tune in to the appropriate channel to listen to movie sound tracks inside their own cars, wherein no wired speakers or posts would be required. The system simply broadcasts sound to existing radio/stereo systems inside the cars, wherein movie-goers can listen to movies on their own sound systems.

The short-range radio system of the present invention preferably operates at low power and allows the signals to be broadcast in a significantly limited area so that only those cars that are on the top floor 11, or possibly on other levels of the parking garage 1, would be able to listen to the movies. The limited range of the radio broadcasts enables the present system to avoid interference with other radio stations and broadcasts in the same or similar frequencies.

Where short-range radio broadcast licenses are available from the FCC, the present invention contemplates that the appropriate license(s) can be obtained to broadcast the movies on a particular frequency, which can be assigned to the system. Obtaining the license can ensure that there is no interference between the present system and any other radio station in the area.

At the present time, the FCC is unable to grant additional short-range radio broadcast licenses due to the unavailability of radio airwave space. Accordingly, one aspect of the present invention is that a short-range radio broadcast system which complies with the FCC rules can be provided without having to obtain a license. Under current FCC laws, unlicensed short-range AM-radio broadcasts are allowed so long as they are limited to an effective service range of about 200 to 250 feet. Likewise, unlicensed short-range FM-radio broadcasts are allowed so long as they are limited to an effective service range of about 35 to 100 feet, with a maximum bandwidth of 200 kHz. Given these requirements, it is a function of the present invention to be able to provide the appropriate short-range radio broadcasts to allow each car on the top floor 11 to receive the signals without violating the FCC rules.

In this respect, in the preferred embodiment, the present invention contemplates that the drive-in theater can be adapted with the appropriate number of radio transmitters with antennas necessary to send signals to every car on the top floor 11 regardless of the size of the top floor. That is, when the top floor 11 is larger than the area that can be reached by a single transmitter operating at a single frequency within the FCC guidelines discussed above, the present invention contemplates that more than one transmitter and antenna can be provided at different locations on the top floor 11, with each transmitter capable of operating at a different frequency.

For example, when AM transmissions are used, if the top floor 11 is larger than the area that can be serviced by one unlicensed AM transmitter, i.e., larger than a radius of about 250 feet, the top floor can be divided into multiple areas, each having a separate transmitter antenna, i.e., capable of operating at the same or different frequency. This way, cars located on one area of the top floor 11 can be reached by one transmitter antenna, and cars located in other areas of the top floor 11 can be reached by other transmitter antennas. In this fashion, the broadcasts preferably reach every car on the top floor 11 without individually extending any broadcast beyond the allowable service range provided by the FCC. When required, each transmitter preferably sends signals at a different frequency.

Since the allowable unlicensed service range set by the FCC is smaller for FM broadcasts than for AM broadcasts, it is contemplated that when FM frequencies are used, a greater number of transmitters with antennas would have to be used to cover the same size top floor 11. For example, where the top floor 11 of the parking garage 1 has an effective size of about 400 feet by 600 feet, there would likely have to be at least six transmitters and preferably more to cover the top floor. At least one FM transmitter antenna would probably have to be located every 200 feet or less, insofar as each transmitter can only cover an area consisting of a radius of less than 100 feet. And, to ensure that there are no black out areas between transmissions, transmitter are likely to be needed more often than one every 200 feet. Placing transmitter antennas in a triangular pattern can, in this respect, help ensure that even coverage is achieved.

In this respect, the transmitter antennas are preferably located on the top floor in a manner that allows each car to receive clear signals, while maximizing the coverage by each transmitter. That is, the top floor is preferably divided into a number of areas sufficient to cover the entire top floor, wherein at least one transmitter antenna is located in each area, and each transmitter is adapted to operate at a different frequency. This way, cars located in one area can set their radios to one frequency, while cars located in other areas can set their radios to other frequencies. In this manner, none of the transmitters would individually extend beyond the allowable service range set by the FCC.

Because transmitters in this type of system must accept any interference caused by other broadcasts in the same or similar frequencies, in actual practice, the effective service range of each transmitter may be further limited. Accordingly, to reduce the likelihood of interference with other broadcasts, the total number of transmitters for any given area may have to be increased, i.e., the density may have to be increased. For example, rather than placing one FM transmitter every 200 feet, or one AM transmitter every 500 feet, one FM transmitter may be needed every 100 feet or so, or one AM transmitter may be needed every 250 feet or so. Since the actual effective service range of each transmitter may be lower than the allowable limit set by the FCC, depending on how crowded the airwaves are for any particular area, the present invention contemplates that more areas and transmitters may be provided to ensure that each car on the top floor will receive clear uninterrupted signals.

For persons inside the cars to listen to the movies, they simply have to set their radios/stereos to the appropriate station within the designated areas. That is, the present invention contemplates that the parking spaces can be numbered and designated radio frequencies assigned to each parking space such that the appropriate radio frequency can be used by each moviegoer. Participants are preferably informed which frequencies should be used to obtain the strongest signals in their areas, which are likely to be the ones nearest their cars.

The present invention also contemplates that, when possible, the frequencies on each of the transmitters can be set to operate at the same frequency. That is, the present invention contemplates that a plurality of transmitters operating at the same frequency can be used so that each car on the top floor 11 can tune into the same channel. This is contemplated as a means of satisfying the FCC guidelines without having to use multiple frequencies.

FIG. 2 shows a plurality of transmitters with antennas 35 located on the top floor 11. In this embodiment, a total of six transmitters are provided along rows of parking spaces and ramps 13 to ensure that every parking space will be able to receive radio broadcast signals. The transmitters 35 can be built in any conventional manner, and can, for example, be housed in protective structural water-proof boxes located on the top floor 11. The boxes can be located on posts extending upward from the top floor 11, or built into the floor, etc. The necessary wiring to the transmitter boxes preferably run through the top floor 11, from the broadcast radio system, which can be conveniently located in the projector building 25.

The actual sound system used by the present invention can be any conventional type capable of playing back the movie soundtrack and having it broadcast on short range radio via the transmitters. The system contemplates being able to transmit the signals at the same or different frequencies from different transmitters, and preferably has means of controlling, adjusting and setting the frequencies that are employed by each transmitter. The bandwidths of the signals are also preferably capable of being controlled by the system as needed. The power generated by the sound system need not be very high since only very short ranges are contemplated.

While the sound system of the present invention can be used for applications on top of parking garages, it is also contemplated that the same system can be used in connection with virtually any type of drive-in theater. For example, this type of sound system can be utilized in any existing on-the-ground drive-in theater.

In another embodiment, the present invention contemplates that a carrier current station can be used to transmit signals via one or more power lines. The FCC allows unlicensed low power transmissions consisting of AM radio frequency signals between about 535 and 1705 kHz, wherein the signals are injected into power lines, and the effective service range is about 200 feet from the power line.

In this embodiment, one or more power lines that extend through the top floor can be used, wherein the signals can be injected into the power lines from the radio system to broadcast movie sound to cars located on the top floor 11 As with the transmitters, this embodiment contemplates using a sufficient number of power lines spaced a predetermined distance apart from one another to ensure that each car on the top floor receives uninterrupted signals.

The advantage of this system is that no separate transmitters have to be provided and located on the top floor. The signals are simply injected into power lines that are already needed to provide electrical service to areas on the parking garage, such as those needed to service lights, etc. Also, since the effective service range can be up to 200 feet from the power line, a larger area can be serviced, such as by using power lines that run through the top floor, without having to add more transmitters.

In the present invention, the parking garage 1 structure is adapted to meet the building code requirements that exist for applications of this kind. For example, the parking garage structure 1 must be reinforced to support the weight of the projector building 25, as well as the usable dwelling space on the top floor 11. Because the building code requirements for usable dwelling spaces are typically higher than those for parking garages, it is likely to be necessary that the structure be reinforced to satisfy the building code requirements. In this respect, when renovations are contemplated to provide a drive-in movie theater on top of existing parking garages, structural modifications and improvements are likely to be needed to ensure that the building code requirements are met.

Figure 6:
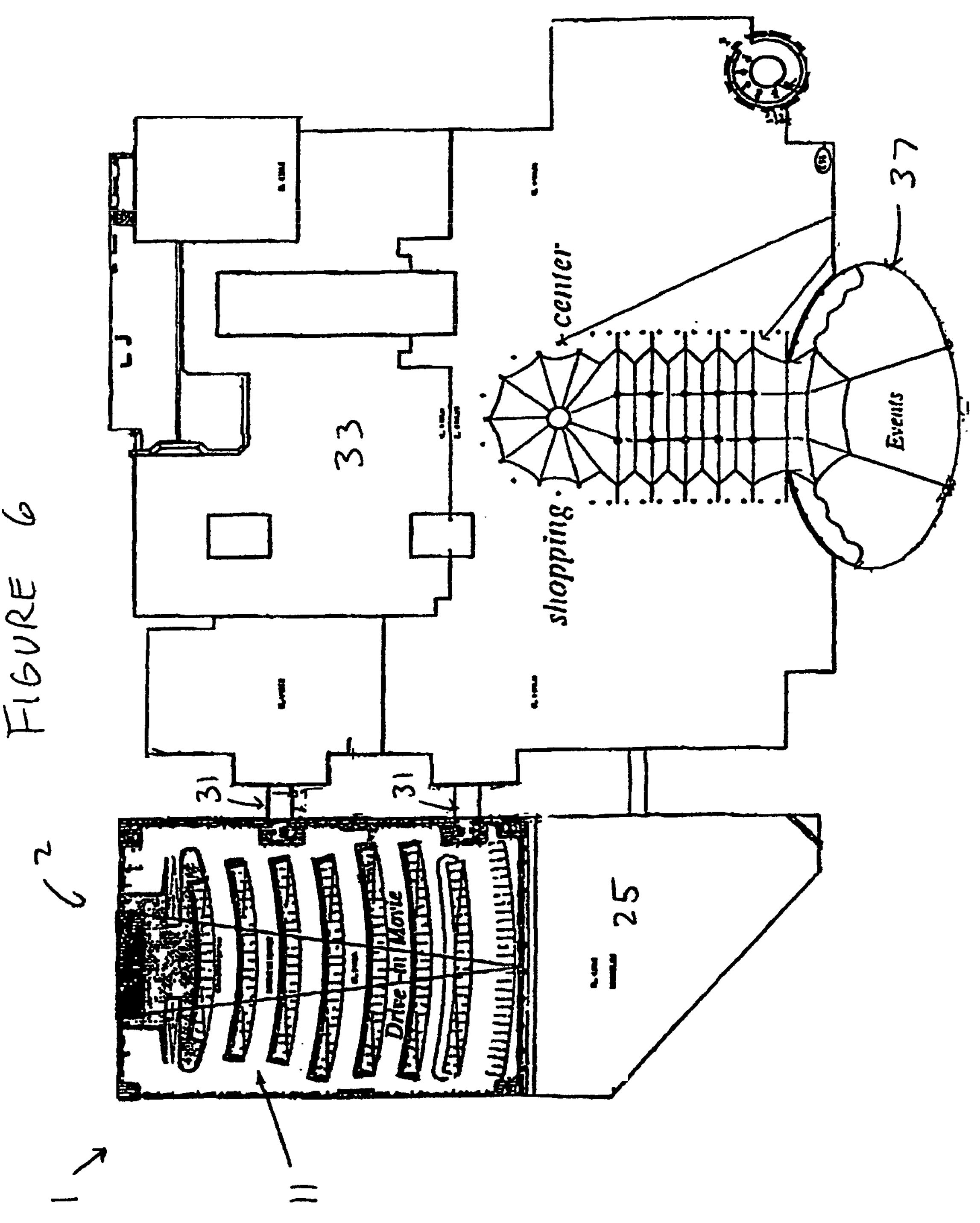
FIG. 6 is a site plan of the drive-in theater and events center of the present invention showing the drive-in theater on top of one parking garage and the events center on top of another parking garage, wherein the shopping mall or similar complex is connected to both the drive-in theater and events center.

FIG. 6 is a site plan of the shopping center of the present invention including the parking garage 1 with the drive-in movie theater 2 on top, and an events center 37 located on or adjacent the shopping mall 33 on another parking garage 39. The combination of the drive-in movie theater 2, events center 37 and shopping mall 33 allows individuals to walk between these areas in a convenient manner. For example, someone who attends the drive-in movie theater 2 can walk across the pedestrian bridge 31 into the shopping mall 33 and over to the events center 37, and vice verse.

Figure 8:
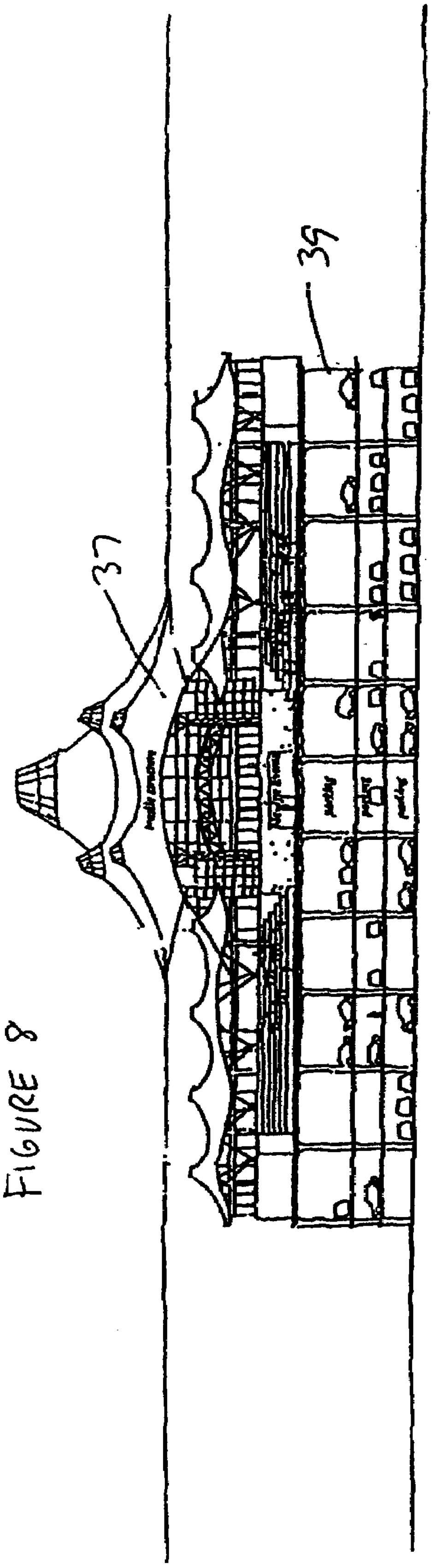
FIGS. 8 and 9 are sectional views of the events center of the present invention connected to the shopping mall.
Figure 9:
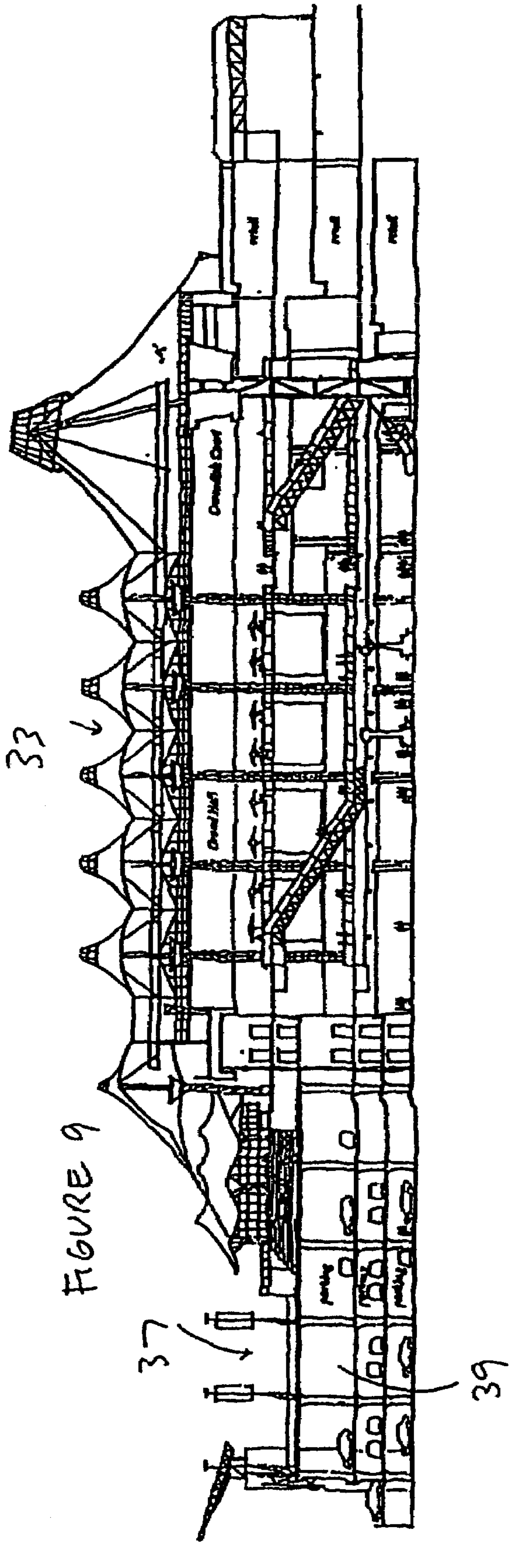

As shown in FIGS. 8 and 9, the events center 37 of the present invention is located on top of parking garage 39 to maximize the use of available space in the mall (which can be scarce in many urban areas). The objective is to build parking garages which are connected to the shopping mall 33, and then to utilize the space above the garages in an efficient manner to increase the amount of usable space available. By virtue of having the events center 37 and drive-in movie theater 2 located on top of parking garages, the area within the mall can be used more efficiently.

The events center 37 is preferably an outdoor auditorium with an area for a stage and backstage, and a perimeter seating area, such as with bleachers and chairs. Although any type of auditorium or structure in which people can gather can be provided, the preferred embodiment has an auditorium with stadium-type seating, wherein the events that take place in the auditorium are capable of being viewed by the maximum number of people possible within the area.

Another feature provided by the present invention is that restaurants and other eating establishments can be located adjacent to and around the events center 37. These restaurants preferably have seating areas and/or windows that overlook the events center 37 such that people who attend the restaurants can sit and view the activities that take place there. Premium seating at the restaurants for viewing events can be provided in this manner.

In one embodiment, the parking areas under the events center 37 are preferably connected to the parking areas under the drive-in movie theater 2. This way, people who park their cars under the events center 37 can go directly to the drive-in movie theater 2 and can avoid traffic around the mall.

Figure 7:
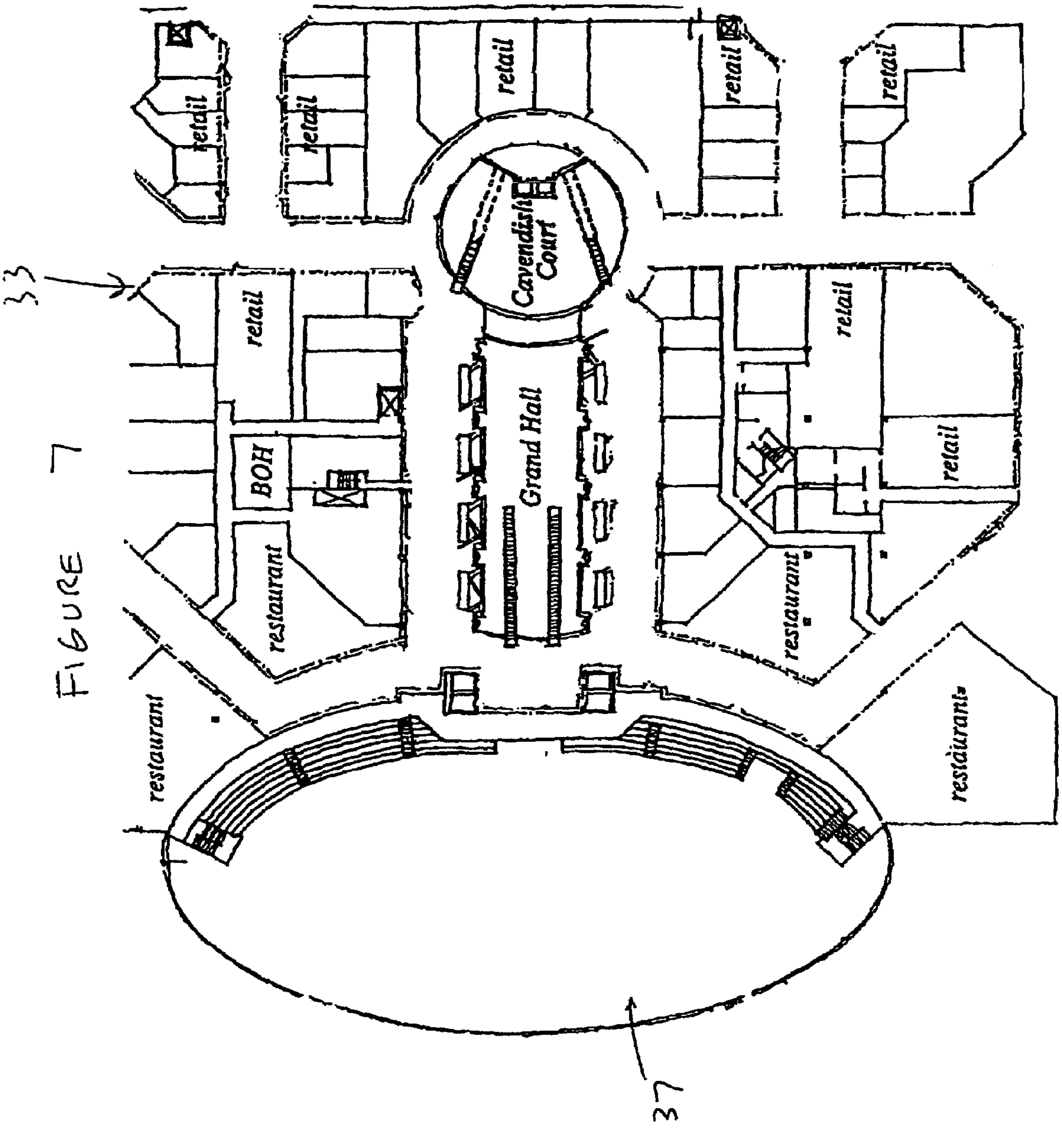
FIG. 7 is a site plan of the events center of the present invention showing it connected to the shopping mall where various retail establishments and restaurants are located.

FIG. 7 shows the events center 37 adjacent to the shopping mall 33 wherein a number of restaurants and retail establishments, as well as atriums and open spaces, are provided therein. An open-hall environment is preferred so that the design is aesthetically pleasing and inviting to those who attend.

The present invention has been described in terms of the preferred embodiments. It should be understood, however, that the invention is not limited to the specific embodiments disclosed herein.

The Invention claimed is:

1. A shopping mall or other complex comprising:

a retail shopping structure comprising at least a first building;

at least one multi-level parking garage associated with said shopping mall or other complex, wherein said parking garage has a top parking level, and wherein said top parking level has a first and second end;

a second building for housing a projector substantially constructed on top of said top parking level, and located at said first end;

a screen extending upward from said top parking level, wherein said screen is located on said second end of said parking garage, opposite said first end;

wherein said parking garage and said first building are separate structures, and at least one bridge connects said parking garage with said first building;

said second building has at least one restaurant anchor other eating establishment therein from where persons in said restaurant and/or other establishment can view said screen wherein said screen extends upward from a peripheral edge of said parking garage, such that the back side of said screen faces away from the top parking level and away from said second building; and Wherein said first building has a first elevation, said second building has a second elevation, said screen has a third elevation, and said top parking level has a fourth elevation, wherein said first, second and third elevations are extended above said fourth elevation, such that said first and second buildings, and said screen, help to substantially block the view of the screen from the outside;

said top parking level has multiple inclined spaces on which cars can be parked for viewing said screen;

a second multi-level parking garage with an events center provided on top of said second parking garage, and wherein at least one restaurant and/or other eating establishment is provided in association with said events center, such that persons in said restaurant and/or other establishment can view events occurring at said events center; and wherein a short range radio sound system with at least one transmitter is provided on said parking garage, to provide sound for vehicles parked on said top parking level, wherein said system is adapted for use in connection with a drive in movie theater located on said parking garage wherein said short range radio sound system is adapted so that only cars located on or substantially near said top parking level of said parking garage are able to receive transmissions from said transmitters, wherein said sound system has the following features: a) said short range radio sound system enables movie-goers on said top parking level to listen to movies on pre-selected channels in their own cars, and wherein said sound system comprises multiple transmitters intermittently located on said top parking level, for sending broadcast signals through the air; b) wherein each of said at least one transmitter has an effective service range that is capable of reaching more than a single car, but does not exceed the maximum allowed distance for unlicensed use; c) a control mechanism for controlling, adjusting and setting the frequencies of the signals transmitted by said at least one transmitter is provided, wherein said control mechanism is adapted to adjust transmitters at different locations to different frequencies, to ensure that any one transmission by any one transmitter will not exceed the maximum distance allowed for unlicensed use; and d) said top parking level of said parking garage is divided into a plurality of areas, wherein each areas has at least one transmitter capable of operating at a different frequency.

* * * * *